United States Patent
Suzuki

(10) Patent No.: US 10,757,454 B2
(45) Date of Patent: Aug. 25, 2020

(54) MULTIPLEXING APPARATUS AND METHOD FOR VIDEO TRANSMISSION

(71) Applicant: Kabushiki Kaisha Toshiba, Tokyo (JP)

(72) Inventor: Toshio Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 173 days.

(21) Appl. No.: 15/633,840

(22) Filed: Jun. 27, 2017

(65) Prior Publication Data

US 2018/0084288 A1 Mar. 22, 2018

(30) Foreign Application Priority Data

Sep. 20, 2016 (JP) .................................. 2016-183153

(51) Int. Cl.
| | | |
|---|---|---|
| H04N 21/236 | (2011.01) | |
| H04N 21/434 | (2011.01) | |
| H04N 21/643 | (2011.01) | |
| H04N 21/854 | (2011.01) | |

(52) U.S. Cl.
CPC ....... *H04N 21/236* (2013.01); *H04N 21/4345* (2013.01); *H04N 21/64322* (2013.01); *H04N 21/85406* (2013.01)

(58) Field of Classification Search
CPC ........... H04N 21/236; H04N 21/85406; H04N 21/64322; H04N 21/4345
See application file for complete search history.

(56) References Cited

U.S. PATENT DOCUMENTS

| | | | |
|---|---|---|---|
| 8,220,038 B1* | 7/2012 | Lucchesi | H04L 63/105 726/4 |
| 10,079,649 B2* | 9/2018 | Oh | H04H 60/07 |
| 2002/0059643 A1* | 5/2002 | Kitamura | H04N 5/4401 725/136 |
| 2003/0061369 A1* | 3/2003 | Aksu | H04N 21/6437 709/231 |
| 2005/0021874 A1* | 1/2005 | Georgiou | G06F 15/167 709/250 |
| 2005/0160252 A1* | 7/2005 | Nowakowski | H04N 21/4344 712/20 |
| 2009/0260041 A1* | 10/2009 | McGinn | H04N 21/23605 725/62 |
| 2011/0044271 A1* | 2/2011 | Hong | H04W 28/06 370/329 |
| 2013/0007291 A1* | 1/2013 | Nickols | H04L 65/1069 709/228 |

(Continued)

FOREIGN PATENT DOCUMENTS

| | | |
|---|---|---|
| JP | 2001-016582 A | 1/2001 |
| WO | 2015/146378 A1 | 4/2017 |

*Primary Examiner* — Randy A Flynn
(74) *Attorney, Agent, or Firm* — Baker Botts L.L.P.

(57) ABSTRACT

According to one embodiment, a multiplexing apparatus includes a processor and a multiplexer. The processor is configured to identify the version of the video transmission standard of each of input packets, and to convert the version of the packet into a reference version of a predetermined video transmission standard if the identified version is different from the reference version. The multiplexer is configured to multiplex the input packets, based on the reference version.

8 Claims, 4 Drawing Sheets

(56) References Cited

U.S. PATENT DOCUMENTS

| | | | |
|---|---|---|---|
| 2013/0016282 A1* | 1/2013 | Kim | H04N 21/242 |
| | | | 348/521 |
| 2013/0111002 A1* | 5/2013 | Leber | H04L 69/08 |
| | | | 709/223 |
| 2013/0301466 A1* | 11/2013 | Nenner | H04W 36/0022 |
| | | | 370/252 |
| 2014/0149545 A1* | 5/2014 | Bouazizi | H04N 21/85406 |
| | | | 709/217 |
| 2015/0281746 A1* | 10/2015 | Lam | H04N 21/2368 |
| | | | 725/116 |
| 2016/0330513 A1* | 11/2016 | Toma | H04N 21/44008 |
| 2017/0048560 A1 | 2/2017 | Tanaka et al. | |
| 2017/0078207 A1* | 3/2017 | Atkins | H04L 47/24 |
| 2018/0069728 A1* | 3/2018 | Kitazato | H04N 21/236 |

* cited by examiner

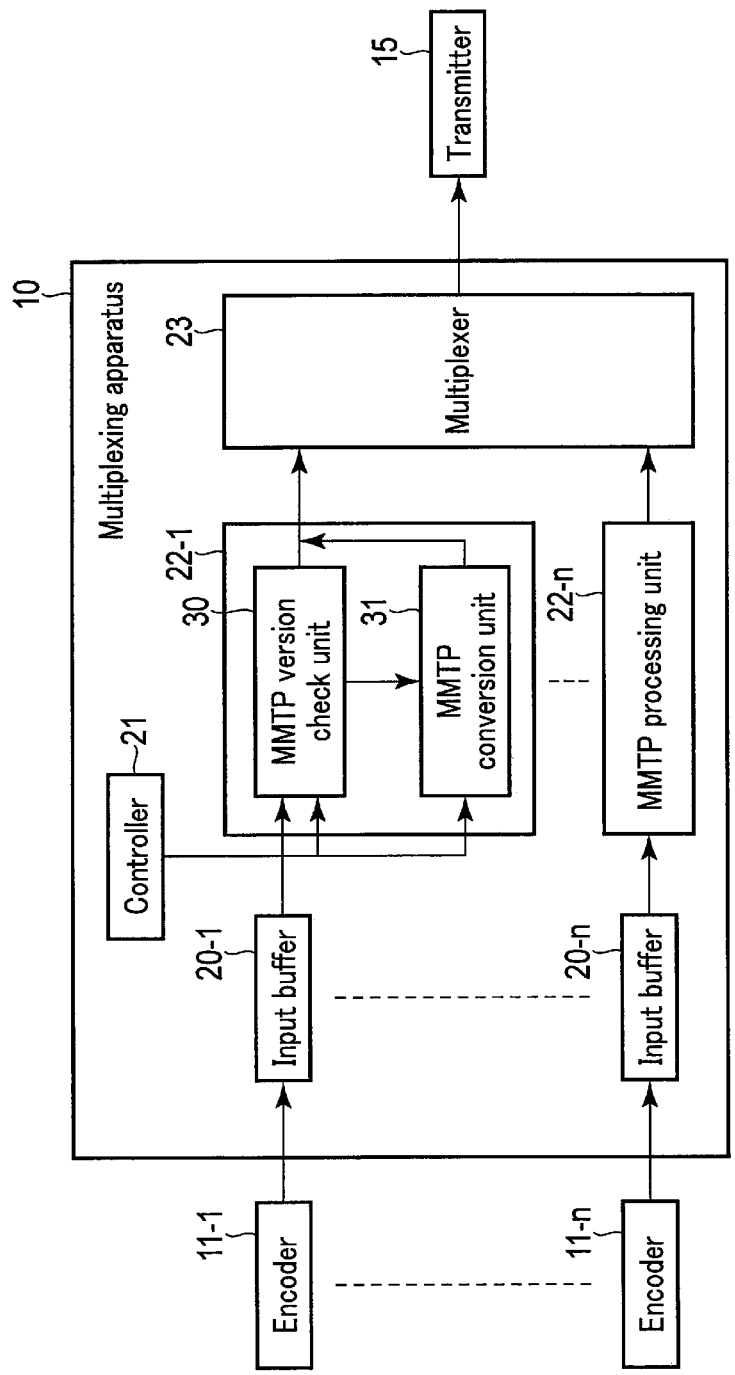
F I G. 2

MULTIPLEXING APPARATUS AND METHOD FOR VIDEO TRANSMISSION

CROSS-REFERENCE TO RELATED APPLICATIONS

This application is based upon and claims the benefit of priority from Japanese Patent Application No. 2016-183153, filed Sep. 20, 2016, the entire contents of which are incorporated herein by reference.

FIELD

Embodiments described herein relate generally to a multiplexing apparatus and a multiplexing method which are applicable to video transmission by broadcasting or communications.

BACKGROUND

In recent years, the video transmission system applicable to ultra-high-definition TV broadcasting and referred to as an MPEG media transport (MMT) system is attracting attention. In the following, the system may be referred to as the MMT system or MMT standard.

The MMT system is a system standardized internationally by the Moving Picture Experts Group (MPEG). It is a transmission system which processes data, including video, sound, caption or program guide components, in the form of MMT protocol (MMTP) packets, and which transmits the MMTP packets as Internet protocol (IP) packets. By application of the MMT system, contents such as videos and sound can be distributed using a plurality of such transmission channels as broadcast channels or communication channels, and contents distribution service using both broadcasting and communications is enabled.

In broadcast service to which the MMT system is applied, a plurality of components including videos, sound, captions and program guides are packetized, and the resultant packets (which may be referred to as MMTP/IP packets) are multiplexed by a multiplexing apparatus, for transmission.

When the MMT standard is updated, there may be a case where different versions of MMT standard are included in one broadcasting system. The multiplexing apparatus receives a large number of outputs from broadcast devices compatible with the MMT standard (such as MMTP/IP packet transmission devices) and executes multiplexing processing for the received outputs. In this case, the MMTP/IP packets received by the multiplexing apparatus have to be of the same MMT standard version. In the broadcasting system, therefore, the broadcast devices compatible with the MMT standard have to be simultaneously updated such that they correspond, for example, to the latest version of MMT standard. This imposes a constraint at the time of system updating.

Under the circumstances, it is desired that the multiplexing apparatus compatible with MMT standard can execute multiplexing processing even if the MMTP/IP packets supplied thereto are of different versions of MMT standard.

BRIEF DESCRIPTION OF THE DRAWINGS

FIG. 2 is a block diagram illustrating the configuration of a multiplexing apparatus of the embodiment.

DETAILED DESCRIPTION

In general, according to one embodiment, a multiplexing apparatus includes a processor and a multiplexer. The processor is configured to identify the version of the video transmission standard of each of input packets, and to convert the version of the packet into a reference version of a predetermined video transmission standard if the identified version is different from the reference version. The multiplexer is configured to multiplex the input packets, based on the reference version.

Various embodiments will be described hereinafter with reference to the accompanying drawings.

Figure 1:
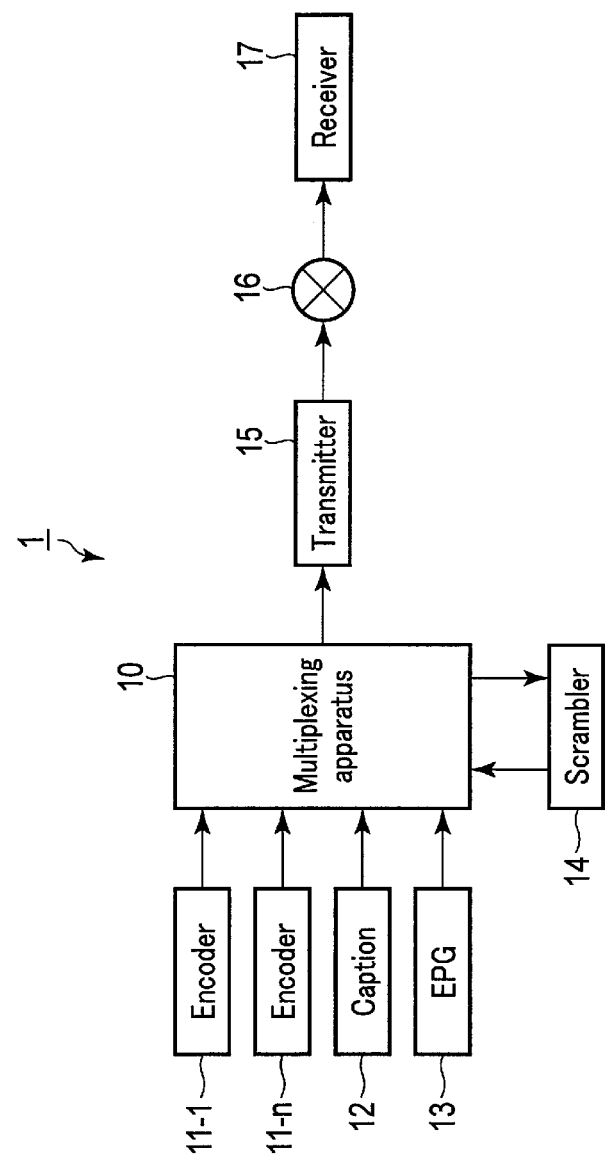
FIG. 1 is a block diagram illustrating the configuration of a system of an embodiment.

FIG. 1 is a block diagram illustrating the configuration of a system (e.g., a broadcasting system) according to one embodiment. As shown in FIG. 1, the system 1 comprises a multiplexing apparatus 10, encoders 11-1 to 11-$n$ compatible with the MPEG media transport (MMT) standard, a caption sending unit 12 for sending a caption, an electronic program guide (EPG) sending unit 13, a scrambler 14, a transmitter 15, and a transmission channel 16.

The encoders 11-1 to 11-$n$ encode videos and sound data according to the MPEG standard, packetizes the resultant data according to the MMT standard, and outputs MMTP/IP packets (i.e., data in the form of packets). Likewise, the caption sending unit 12 and the EPG sending unit 13 respectively packetize the caption data and the electronic program guide data according to the MMT standard and output MMTP/IP packets obtained thereby.

The multiplexing apparatus 10 is a core element of the present embodiment. It receives MMTP/IP packets (which are output from the encoders 11-1 to 11-$n$, caption sending unit 12 and EPG sending unit 13 and are packets of a plurality of components including videos, sound, captions and electronic program guides), and carries out multiplexing processing for the received MMTP/IP packets.

The scrambler 14 encrypts the components included in the packets multiplexed by the multiplexing apparatus 10. The transmitter 15 transmits the MMTP/IP packets multiplexed by the multiplexing apparatus 10, by way of the transmission channel 16. A receiver 17, such as an ultra-high definition television, receives contents (videos, sound, captions, electronic program guides or the like) in the form of packets delivered by the present system 1, and supplies them to a display, for reproduction.

[Configuration of Multiplexing Apparatus]

FIG. 2 is a block diagram illustrating the configuration of the multiplexing apparatus 10. In FIG. 2, illustration of the caption sending unit 12, EPG sending unit 13 and scrambler 14 is omitted for the sake of expedience.

As shown in FIG. 2, the multiplexing apparatus 10 includes a plurality of input buffers 20-1 to 20-$n$, a controller 21, MMT protocol (MMTP) processing units 22-1 to 22-$n$ and a multiplexer 23. The input buffers 20-1 to 20-$n$ receive MMTP/IP packets from the respective encoders 11-1 to 11-$n$ and retain them. The multiplexing apparatus 10 also include input buffers (not shown) corresponding to the caption sending unit 12 and EPG sending unit 13.

The input buffers 20-1 to 20-$n$ receive MMTP/IP packets output from the encoders 11-1 to 11-$n$ and supplies them to MMTP processing units 22-1 to 22-$n$. The controller 21 controls an operation of the multiplexing apparatus 10. In the present embodiment, the controller 21 mainly controls an operation of the MMTP processing units 22-1 to 22-n. The controller 21 and the MMTP processing units 22-1 to 22-n may be composed of hardware of a computer, the main element of which is a processor and software.

The multiplexer 23 sorts out the MMTP/IP packets output from the MMTP processing units 22-1 to 22-n according to the settings provided by an upper-level controller (not shown), and executes multiplexing processing for the selected MMTP/IP packets.

Next, the configuration of the MMTP processing units 22-1 to 22-n will be described, with MMTP processing unit 22-1 being taken as a representative example.

As shown in FIG. 2, the MMTP processing unit 22-1 includes an MMTP version check unit 30 and an MMTP conversion unit 31. The MMTP version check unit 30 checks the version of the MMT standard of an MMTP/IP packet input to the input buffer 20-1 (the version may be referred to as an MMTP version). If the MMTP version of the input MMTP/IP packet is the same as the latest MMTP version indicated by the controller 21, then the MMTP version check unit 30 supplies the MMTP/IP packet to the multiplexer 23 (see FIG. 3).

If the MMTP version of the input MMTP/IP packet differs from the latest MMTP version indicated by the controller 21, then the MMTP version check unit 30 supplies the MMTP/IP packet and the version information detected at the check processing to the MMTP conversion unit 31. Under the control of the controller 21, the MMTP conversion unit 31 converts the MMTP/IP packet into a packet of the latest MMTP version indicated by the controller 21, and supplies the resultant packet to the multiplexer 23 (see FIG. 4).

[Processing Performed by MMTP Processing Unit]

The specific processing performed by MMTP processing unit 22-1 will be described with reference to the flowchart shown in FIGS. 3 and 4. The other MMTP processing units 22-n perform processing similar to that of MMTP processing unit 22-1.

Figure 3:
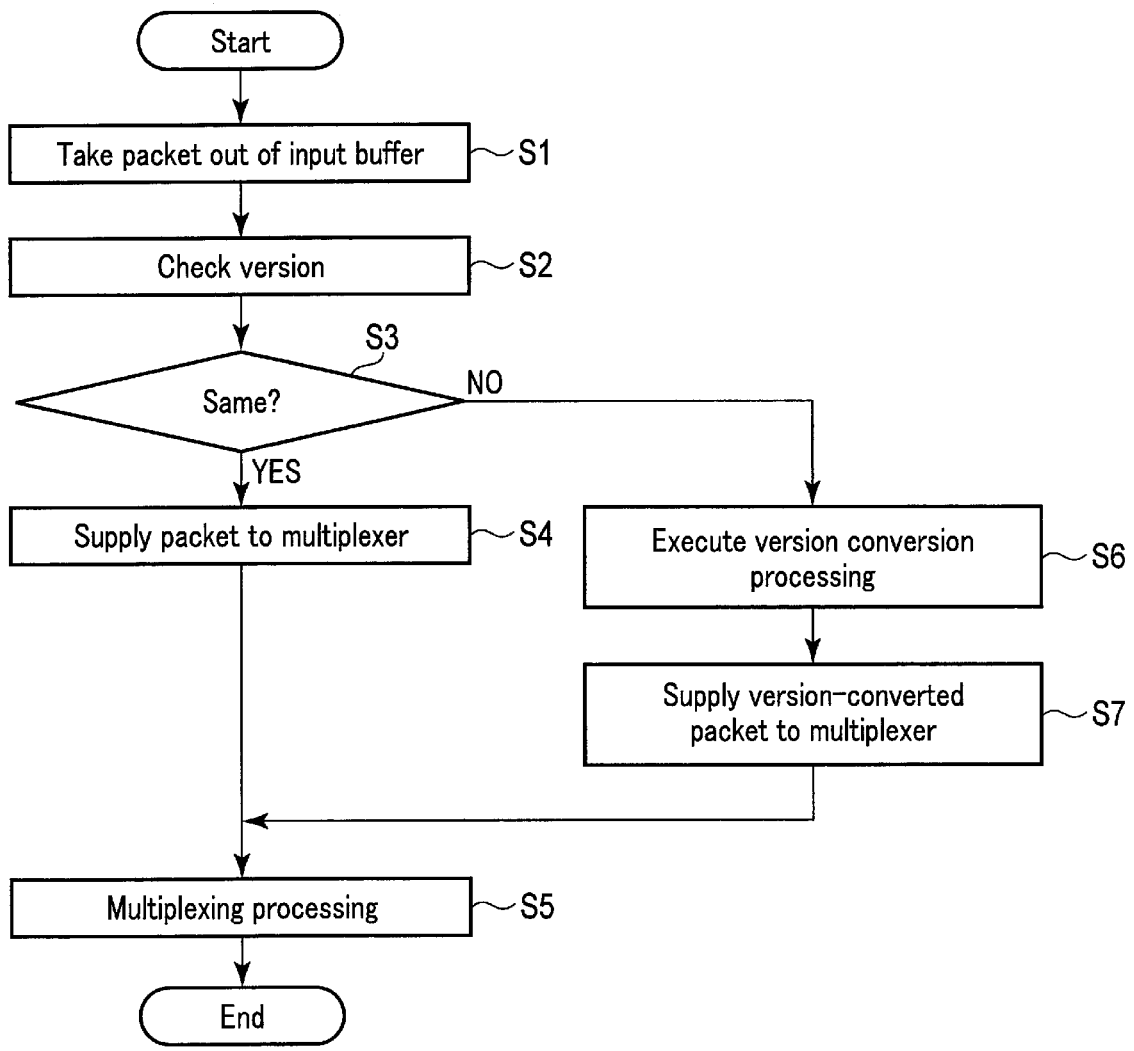
FIG. 3 is a flowchart illustrating processing performed by an MMTP processing unit of the embodiment.

As shown in FIG. 3, MMTP processing unit 22-1 takes the MMTP/IP packet out of input buffer 20-1 under the control of the controller 21 and the supplies the MMTP/IP packet to the MMTP version check unit 30 (step S1). The MMTP version check unit 30 checks whether or not the MMTP version of the input MMTP/IP packet is the same as the reference MMTP version, based on the reference MMTP version information indicated by the controller 21 (step S2). The reference MMTP version is an MMTP version to be output to the multiplexer 23 and is, for example, the latest MMTP version.

In the present embodiment, the controller 21 uses the MMTP parameter information and the MMTP version information of the reference MMTP version (latest MMTP version) as version check information. Unlike the version information preset at the header of a packet, the MMTP version information is descriptor information such as a time stamp descriptor included in a payload. If the version information preset at the header can be used, such version information may be used for version check.

In the present embodiment, the controller 21 prepares (stores) MMTP parameter information and MMTP version information from the latest MMTP version to the original version, and manages them in the form of a table referred to by entry of a version. The MMTP parameter information includes detailed parameter information, table information and descriptor information for each of the MMTP versions.

If the check result of the MMTP version check unit 30 indicates that the MMTP version of the input MMTP/IP packet is the same as the reference MMTP version (YES in step S3), the controller 21 performs control such that the MMTP/IP packet is supplied to the multiplexer 23 (step S4).

If the check result of the MMTP version check unit 30 indicates that the MMTP version of the input MMTP/IP packet is different from the reference MMTP version (NO in step S3), the MMTP conversion unit 31 executes version conversion processing under the control of the controller 21 (step S6), as will be described later. The controller 21 performs control such that the MMTP/IP packet, the version of which is converted by the MMTP conversion unit 31, is supplied to the multiplexer 23 (step S7).

Where the MMTP version of the input MMTP/IP packet is the same as the reference MMTP version (YES in step S3) or where the version conversion processing is executed (step S6), the multiplexer 23 executes multiplexing processing for the MMTP/IP packets whose MMTP versions are the same as the reference MMTP version (step S5).

The basic processing performed in the present embodiment is as described above. A detailed description will be given, with reference to FIG. 4, as to how the MMTP conversion unit 31 performs version conversion processing.

Turning back to FIG. 3, if the check result of the MMTP version check unit 30 indicates that the MMTP version of the input MMTP/IP packet is different from the reference MMTP version (NO in step S3), the MMTP version check unit 30 executes MMTP version detection processing for the input MMTP/IP packet under the control of the controller 21.

Figure 4:
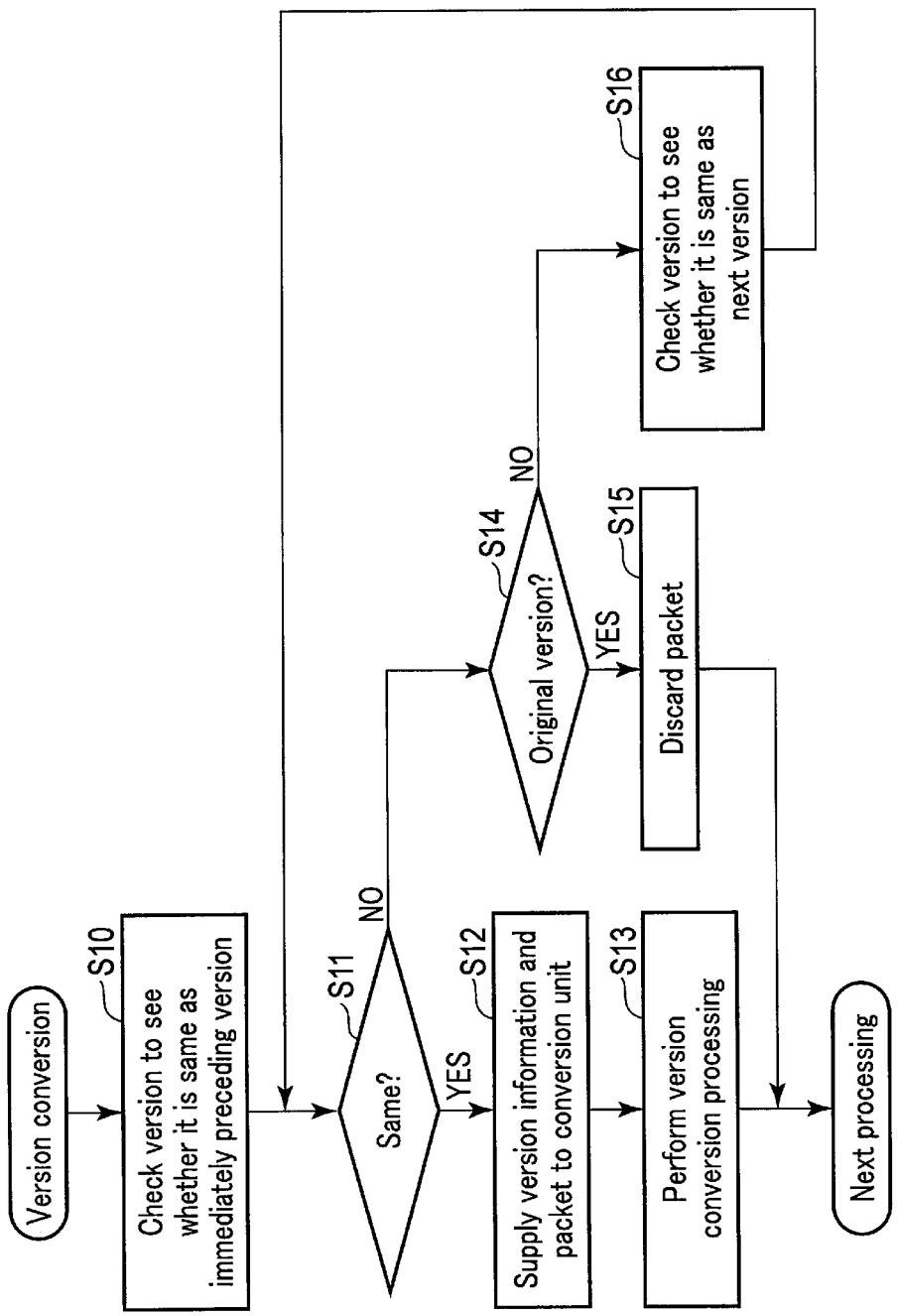
FIG. 4 is a flowchart illustrating processing performed by an MMTP conversion unit of the embodiment.

To be more specific, as shown in FIG. 4, the MMTP version check unit 30 checks the MMTP version of the input MMTP/IP packet to see whether it is the same as the MMTP version immediately preceding the latest version, which is the reference version (step S10).

As described above, the controller 21 prepares MMTP version information from the latest MMTP version to the original version, and sets the immediately preceding MMTP version information in the MMTP version check unit 30.

If the check result of the MMTP version check unit 30 indicates that the MMTP version of the input MMTP/IP packet is the same as the immediately preceding version (YES in step S11), the controller 21 advances to the version conversion processing described later (steps S12 and S13).

If the check result of the MMTP version check unit 30 indicates that the MMTP version of the input MMTP/IP packet is different from the immediately preceding version (NO in step S11), the MMTP version check unit 30 continues to execute MMTP version detection processing for the input MMTP/IP packet under the control of the controller 21 (No in step S14, step S16). The MMTP version check unit 30 determines whether or not the detection processing continues and the MMTP version of the MMTP/IP packet is compared with the original version set by the controller 21 (step S14).

If NO in step S14, the MMTP version check unit 30 checks the MMTP version of the input MMTP/IP packet to see whether it is the same as the next MMTP version,—the first updated version (step S16). If the check result of the MMTP version check unit 30 indicates that the MMTP version of the input MMTP/IP packet is different from the immediately preceding version (NO in step S11), the MMTP version check unit 30 continues to execute MMTP version detection processing (NO in step S14, step S16).

If the MMTP version of the input MMTP/IP packet is not the same as any of the MMTP versions, and the detection processing ends with respect to the original version (YES in step S14), the MMTP packet is regarded as invalid, and the controller 21 is notified of this abnormality. Upon reception of the abnormality from the MMTP version check unit 30, the controller 21 discards the input MMTP/IP packet (step S15).

Where it is detected (confirmed) that an MMTP version is the same as one of the MMTP versions other than the latest MMTP version (reference MMTP version) (YES in step S11), the MMTP version check unit 30 supplies the version information and the MMTP/IP packet to the MMTP conversion unit 31 (step S12).

The MMTP conversion unit 31 performs version conversion processing such that the MMTP version of the MMTP/IP packet output from the MMTP version check unit 30 (namely, the input MMTP/IP packet) is converted to the latest MMTP version (reference MMTP version) (step S13).

To be more specific, the MMTP conversion unit 31 executes version conversion processing, using the MMTP parameter information set by the controller 21, the MMTP version information on the reference MMTP version (latest MMTP version) and the MMTP version information supplied from the MMTP version check unit 30. The MMTP conversion unit 31 converts the MMTP/IP packet output from the MMTP version check unit 30 (i.e., a packet whose MMTP version is not the latest MMTP version) into a packet of the latest MMTP version (reference MMTP version).

The MMTP parameter information set by the controller 21 includes detailed parameter information, table information and descriptor information for each of the MMTP versions. The MMTP version information is descriptor information such as a time stamp descriptor included in a payload. In the version conversion processing, the MMTP conversion unit 31 does not have to convert all of the MMTP parameter information; for example, it may convert only descriptor information.

As described above, the MMT-compatible multiplexing apparatus of the present embodiment can convert a plurality of input MMTP/IP packets into packets of a predetermined reference version (e.g., the latest MMTP version) even if the input MMTP/IP packets include packets of different versions of MMT standard. In other words, even if a plurality of input MMTP/IP packets include packets of different MMTP versions, such packets are converted into packets of one and the same MMTP version, and the resultant packets can be supplied to the multiplexer for multiplexing processing.

Therefore, where the multiplexing apparatus of the present embodiment is applied to a broadcasting system compatible with the MMT standard, the broadcast devices compatible with the MMT standard do not have to be simultaneously updated such that they correspond, for example, to the latest version of MMT standard. This significantly relaxes the constraint imposed at the time of system updating. Because of this, the broadcast devices compatible with the MMT standard can be updated in sequence, thereby enabling easy updating of the broadcasting system compatible with the MMT standard.

In connection with the present embodiment, mention was made of the multiplexing apparatus compatible with the MMT standard, but this is not restrictive. The embodiment is applicable to a multiplexing apparatus whose video transmission system is different from the MMT standard.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A multiplexing apparatus compatible with MMT (MPEG media transport) standard which executes multiplexing processing even if MMTP (MMT Protocol)/IP (Internet Protocol) packets input are of different versions of MMT standard, the MMTP/IP packets comprising packetized components, the apparatus comprising:
   an MMTP processing unit including an MMTP version check unit and an MMTP conversion unit,
      the MMTP version check unit determining a version of video transmission standard for each of the input packets, and identifying a version of the MMTP/IP packets based on comparison with a plurality of predetermined versions if the determined version is different from a reference version of a predetermined video transmission standard,
      the MMTP conversion unit converting the identified version into the reference version, wherein the video transmission standard has a plurality of versions, from a latest version to an original version, and
      the MMTP version check unit determining whether a version of the input MMTP/IP packet is identical to the reference version, with the latest version regarded as the reference version, and identifying the version of the MMTP/IP packet based on comparison with a plurality of versions other than the latest version if the identified version is different from the reference version, wherein the versions used by the MMTP version check unit for comparison including versions from a second latest version to the original version; and
   a multiplexer configured to multiplex the input MMTP/IP packets, based on the reference version.

2. The multiplexing apparatus of claim 1, further comprising: a controller configured to discard the MMTP/IP packet if the version of the MMTP/IP packet fails to be identified.

3. The multiplexing apparatus of claim 1, wherein the multiplexer is further configured to multiplex MMTP/IP packets whose versions are identical to the reference version or MMTP/IP packets whose versions are converted into the reference version by the MMTP conversion unit, based on a determination result made by the MMTP version check unit.

4. The multiplexing apparatus of claim 1, wherein the MMTP version check unit sends MMTP/IP packets whose versions are identical to the reference version to the multiplexer, based on a determination result made by the MMTP version check unit.

5. The multiplexing apparatus of claim 1, wherein the MMTP version check unit sends MMTP/IP packets whose versions are converted to the reference version by the MMTP conversion unit to the multiplexer, based on a determination result made by the MMTP version check unit.

6. A multiplexing method for use in a multiplexing apparatus compatible with MMT (MPEG media transport) standard which multiplexes a plurality of input packets by executing multiplexing processing even if MMTP (MMT Protocol)/IP (Internet Protocol) packets input are of different versions of MMT standard, the MMTP/IP packets comprising packetized components, the apparatus comprising an MMTP processing unit including an MMTP version check unit and an MMTP conversion unit, and a multiplexer, the method comprising:

the MMTP version check unit determining a version of video transmission standard for each of the input MMTP/IP packets, wherein the video transmission standard has a plurality of versions, from a latest version to an original version;

the MMTP version check unit identifying a version of the MMTP/IP packet based on comparison with a plurality of predetermined versions if the determined version is different from a reference version of a predetermined video transmission standard, wherein identifying the version of the packet comprises determining whether a version of an input MMTP/IP packet is identical to the reference version, with the latest version regarded as the reference version;

the MMTP version check unit identifying the version of the MMTP/IP packet based on comparison with a plurality of versions other than the latest version if the identified version is different from the reference version, the versions used for comparison including versions from a second latest version to the original version;

the MMTP conversion unit converting the identified version into the reference version; and the multiplexer multiplexing the input MMTP/IP packets, based on the reference version.

7. The method of claim 6, wherein the apparatus further comprises a controller, and the method further comprises the controller discarding the MMTP/IP packet if the version of the MMTP/IP packet fails to be identified.

8. The method of claim 6, wherein the multiplexer multiplexing the MMTP/IP input packets comprises the multiplexer multiplexing MMTP/IP packets whose versions are identical to the reference version or MMTP/IP packets whose versions are converted into the reference version.

* * * * *